United States Patent

Poirot

[11] 3,815,279
[45] June 11, 1974

[54] FISHING NET
[76] Inventor: Eugene M. Poirot, Golden City, Mo. 64748
[22] Filed: Dec. 10, 1971
[21] Appl. No.: 206,789

[52] U.S. Cl............................. 43/105, 43/8, 43/14, 43/17
[51] Int. Cl............................................ A01k 69/10
[58] Field of Search............. 43/105, 102, 100, 103, 43/14, 7, 8

[56] References Cited
UNITED STATES PATENTS

| | | | |
|---|---|---|---|
| 462,258 | 11/1891 | Jones | 43/8 |
| 522,111 | 6/1894 | Downie et al. | 43/7 |
| 3,033,163 | 5/1962 | Hostetler et al. | 119/52 AF |
| 3,127,692 | 4/1964 | Adleberg | 43/7 |
| 3,508,358 | 4/1970 | Lee | 43/105 |

*Primary Examiner*—Warner H. Camp

[57] ABSTRACT

A fishing net has a portion thereof disposable below the surface of a body of water and has an elongated opening in that portion. Elongated gauging elements are disposed at, and serve to define opposite sides of, that elongated opening; and adjustable spacers hold the confronting surfaces of those gauging elements at desired distances from each other to control the size of the fish which can escape from that fishing net when that fishing net is raised. The sides of the fishing net are generally vertically directed whenever that fishing net is in raised position; and those sides rapidly move into generally vertically directed position as that fishing net is raised, and thereby keep fish from escaping. An elongated stiff member is secured to the fishing net above the level of, and in registry with, the elongated gauging elements; and flexible tension members extend between that elongated stiff member and one of those elongated gauging elements to relieve the fishing net of the weights of those elongated gauging elements. An electric switch is disposed within the fishing net; and it will be biased toward one position but will be held out of that position by food placed within that fishing net. As that food is eaten by the fish, that electric switch will move into the said one position, and will thereby provide a desired electrical effect.

8 Claims, 14 Drawing Figures

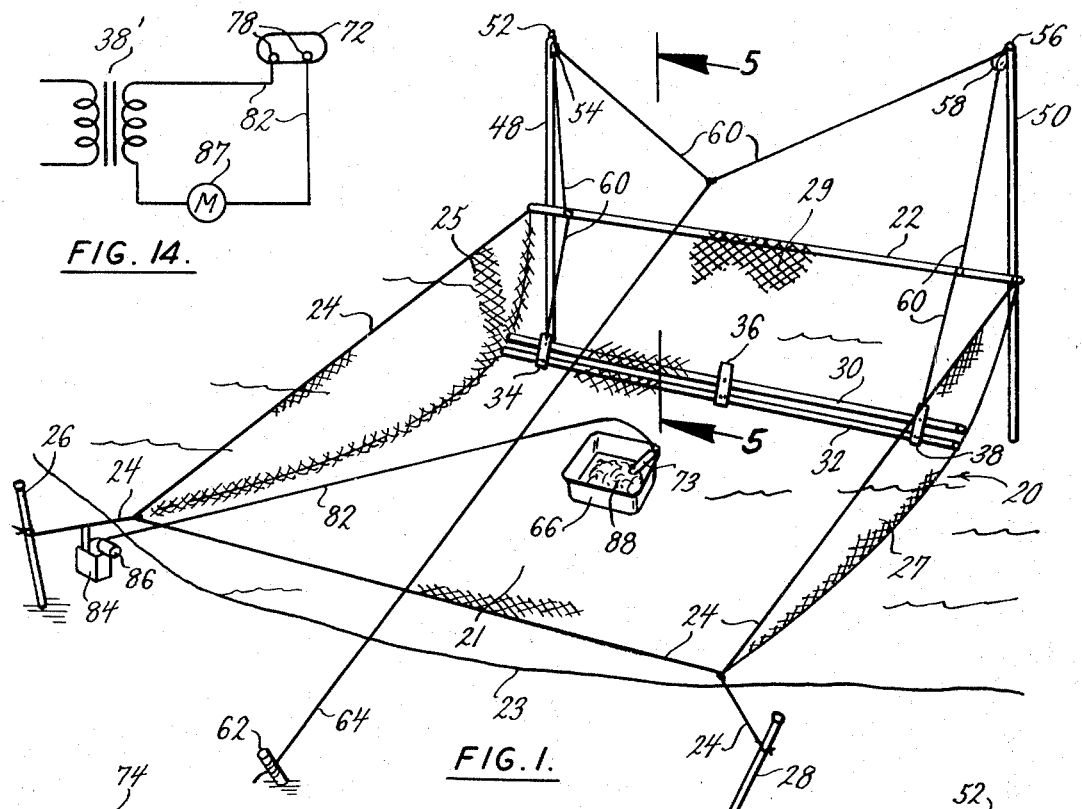
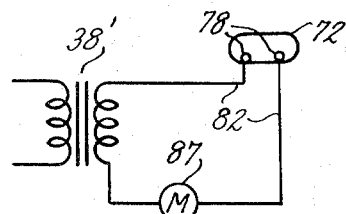
FIG. 14.
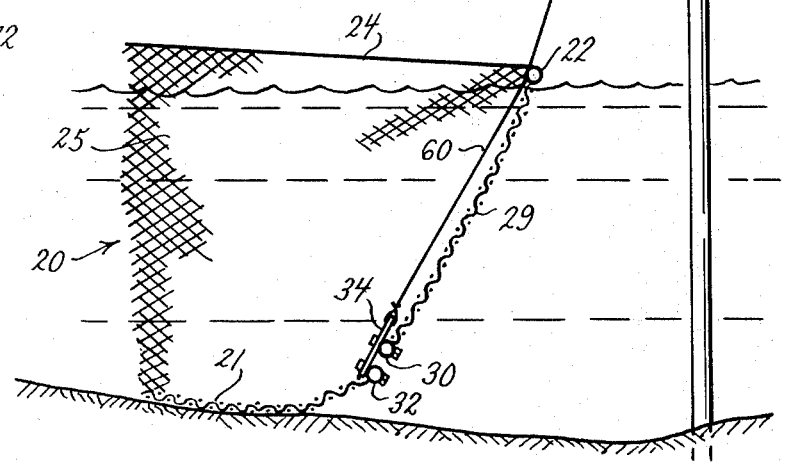
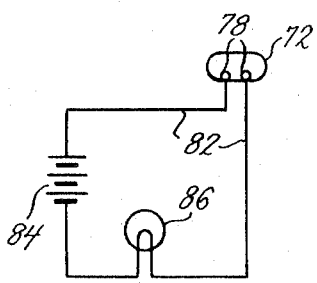
FIG. 4.

FISHING NET

This invention relates to improvements in fishing nets. More particularly, this invention relates to improvements in fishing nets which are used adjacent the shore of a body of water.

It is, therefore, an object of the present invention to provide an improved fishing net that can be used adjacent the shore of a body of water.

Background of the Invention: Where ponds and creeks are used to raise fish, it is customary to use seines or raisable nets to trap some of the fish in those ponds and creeks, to transfer the larger fish to water-filled containers wherein those fish can be transported to lakes, rivers, ponds, creeks or the like, and to release those fish in those lakes, rivers, ponds, creeks or the like. The use of a seine is objectionable; because a seine always disturbs, and can injure or even destroy, useful plants growing in the pond or creek. The use of a standard and usual raisable net is objectionable; because only limited numbers of fish are caught by such nets. In addition, the use of a seine or of a standard and usual raisable net is objectionable; because small fish as well as large fish are caught and held — and the small fish must then be separated from the large fish and returned to the pond or creek.

Summary of the Invention: The fishing net provided by the present invention has a portion thereof disposable below the surface of a body of water and has an elongated opening in that portion. That elongated opening will automatically permit small fish to escape from the fishing net as that fishing net is raised to, and held in, raised position. This is important; because it eliminates all need of sorting the fish by hand or of transferring the fish to a fish-sorting device, and thereby eliminates the injuries to, and the stresses experienced by, fish when they are sorted by hand or are transferred to a fish-sorting device. It is, therefore, an object of the present invention to provide a fishing net that has a portion thereof disposable below the surface of a body of water and that has an elongated opening in that portion.

Elongated gauging elements are disposed at, and serve to define opposite sides of, the elongated opening in the fishing net; and the distance between the confronting surfaces of those elongated gauging elements will determine the size of the fish which can escape through that elongated opening. Adjustable spacing elements are provided for the elongated gauging elements, and those adjustable spacing elements can be adjusted to vary the distance between the confronting surfaces of those elongated gauging elements. As a result, the fishing net of the present invention can be set to harvest fish of differing sizes. It is, therefore, an object of the present invention to provide a fishing net with an elongated opening therein, with elongated gauging elements disposed at and serving to define opposite sides of that elongated opening, and with adjustable spacing elements which can vary the distance between the confronting surfaces of those elongated gauging elements.

The sides of the fishing net of the present invention are generally vertically directed whenever that fishing net is in raised position; and those sides rapidly move into generally vertically directed position as that fishing net is raised. Such rapid movement of those sides enables the fishing net to trap large numbers of fish that are able to escape when a standard and usual raisable net is raised. It is, therefore, an object of the present invention to provide a fishing net with sides which are generally vertically directed whenever that fishing net is in raised position and which rapidly move into generally vertically directed position as that fishing net is raised.

An elongated stiff member is secured to the fishing net above the level of, and in registry with, the elongated gauging elements; and flexible tension members extend between that elongated stiff member and one of those elongated gauging elements. As the fishing net is raised to, and then held in, raised position, an upwardly directed force will be applied to the elongated stiff member. The flexible tension members will apply a corresponding upwardly directed force to one of the elongated gauging elements; and thus will relieve the fishing net of the strains which those elongated gauging elements would otherwise apply to that fishing net. It is, therefore, an object of the present invention to provide a fishing net with an elongated stiff member above the level of, and in registry with, the elongated gauging elements of that fishing net, and with flexible tension members which extend between that elongated stiff member and one of those elongated gauging elements.

To be effective, a fishing net must be raised at a time when large numbers of fish are immediately above that fishing net. Because the feeding habits of fish vary considerably from time to time, it is not possible to predict those feeding habits with precision. As a result, many fishermen have noted wide variations in the number of fish that are caught when a raisable net is raised. To enable a user of a fishing net to know when large numbers of fish are immediately above that fishing net, the present invention disposes an electric switch within that fishing net, biases that electric switch toward one position, but uses food within that fishing net to hold that electric switch out of that position. That electric switch will remain out of that position until sufficiently large numbers of fish have moved into position immediately above the fishing net to eat away enough of the food to permit that electric switch to move to that one position. At such time, that electric switch will provide a desired electrical effect, which will indicate that large numbers of fish are immediately above the fishing net. It is, therefore, an object of the present invention to provide a fishing net with an electric switch therein that is biased toward one position but that can be held out of that position by feed within that fishing net.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention and that invention will be defined by the appended claims.

Brief Description of the Drawing: In the drawing,

FIG. 1 is a perspective view of one preferred form of fishing net that is made in accordance with the principles and teachings of the present invention, FIG. 2 is a sectional view, on an enlarged scale, through a part of a container which is located within that fishing net, FIG. 3 is a plan view, on a still larger scale, of an electric switch mounted within that container, FIG. 4 is a schematic diagram of one electric circuit which embodies the electric switch shown in FIGS. 1-3, FIG. 5 is a side elevational view, on a scale intermediate those of FIGS. 1 and 3, of one end of the fishing net of FIG. 1, as that fishing net appears when it is raised to fish-holding position, FIG. 6 is a front elevational view, on the scale of FIG. 2, of a portion of an elongated opening in the fishing net of FIG. 1 and of elongated gauging elements which are disposed at, and which serve to define, opposite sides of that elongated opening, FIG. 7 is a sectional view, on the scale of FIG. 2, through the elongated opening and elongated gauging elements of FIG. 6, and it is taken along the plane indicated by the line 7—7 of FIG. 6, FIG. 8 is a sectional view that is generally comparable to the sectional view of FIG. 7, but it shows a different means for adjusting the distance between the confronting surfaces of elongated gauging elements adjacent an elongated opening in a fishing net, FIG. 9 is a front elevational view, on a scale intermediate those of FIGS. 1 and 2, of a different fishing net and of different elongated gauging elements that are used adjacent the elongated opening in that fishing net, FIG. 10 is a sectional view, on the scale of FIG. 2, through the elongated gauging elements of FIG. 9, and it is taken along the plane indicated by the line 10—10 in FIG. 9, FIG. 11 is a partially broken-away, partially sectioned view, on a scale intermediate those of FIGS. 1 and 2, of the upper end of one of the two poles shown in FIG. 1, FIG. 12 is a side elevational view of a structure which can be used to raise a fishing net to fish-holding position, FIG. 13 is a front elevational view of the structure shown in FIG. 12, and FIG. 14 is a schematic diagram of another electric circuit which embodies the electric switch shown in FIGS. 1-3.

Description of the Preferred Embodiment:

Figure 6:
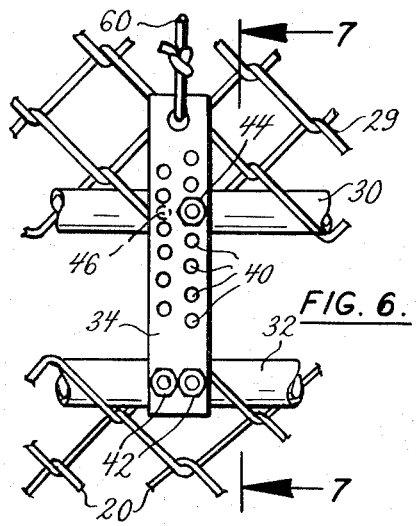

Referring to the drawing in detail, the numeral 20 generally denotes a fishing net that is made in accordance with the principles and teachings of the present invention. That fishing net has a generally rectangular, generally planar center portion 21, a generally triangular, generally planar side portion 25, a generally triangular, generally planar side portion 27, and a generally rectangular, generally planar end portion 29. In the said one preferred embodiment of fishing net, the center portion 21 is 12 feet long and 12 feet wide, each of the side portions 25 and 27 is 3 feet high at one end and has a hypotenuse which is 12 feet long, and the end portion 29 is 12 feet long and 3 feet high. That fishing net is made from readily-flexible but sturdy mesh.

The numeral 22 denotes an elongated, stiff support which is woven into the upper edge of the end portion 29 of the fishing net 20. In the said one preferred embodiment of fishing net, that support is a 12 foot length of one-half inch diameter metal pipe. A rope 24 has one end thereof tied to one end of the support 22; and that rope is woven through the top edge of the side portion 25, through the top edge of the end of the fishing net 20 which is adjacent the shore 23 of a body of water, and through the top edge of the side portion 27 before it is tied to the other end of the support 22. Portions of the rope 24 which are adjacent the shallow end of the side portion 25 of the fishing net 20 are tied to a stake 26 which is driven into the ground a short distance from the water line; and further portions of that rope which are adjacent the shallow end of the side portion 27 of that fishing net are tied to a stake 28 which is driven into the ground a short distance from the water line. When the support 22 of the fishing net 20 is raised to the fishholding position of FIG. 5, the side portion 25 will define a generally vertical plane, the side portion 27 will define a generally vertical plane that is essentially parallel to the plane defined by the side portion 25, and the end portion 29 will define a generally vertical plane that is essentially normal to the planes defined by the side portions 25 and 27. The center portion 21 will essentially rest on the bottom of the body of water.

The end portion 29 of the fishing net 20 has a horizontally extending elongated opening therein; and the elongated sides of that elongated opening are constituted by elongated gauging elements 30 and 32. Those elongated gauging elements are woven into the sections of the end portion 29 of the fishing net 20 which define the elongated opening in that end portion. In the said preferred embodiment of fishing net, the elongated gauging elements 30 and 32 are twelve foot lengths of one-half inch diameter metal pipe.

The numerals 34, 36 and 38 denote metal plates which have a number of openings 40 therein. As shown particularly by FIG. 6, the openings 40 are arranged in two parallel rows; and the openings in one of those rows are staggered relative to the openings in the other of those rows. Two transverse openings are provided in the elongated gauging element 32, and those two openings are in register with two further openings adjacent the bottom of the plate 34. Nut and bolt combinations 42 coact with the openings in the elongated gauging element 32 and with the two further openings adjacent the bottom of the plate 34 to fixedly secure that plate to that elongated gauging element. A nut and bolt combination 44 can coact with an opening in the elongated gauging element 30 and with any one of the openings in the right-hand row of openings 40 of the plate 34 to hold the confronting surfaces of the left-hand ends of the elongated gauging elements 30 and 32 spaced apart a desired distance. A further opening 46 is provided in the elongated gauging element 30; and that opening and one of the openings in the left-hand row of openings 40 of the plate 34 can accommodate the bolt of the nut and bolt combination 44. By setting the bolt of the nut and bolt combination 44 in different openings 40 within the two rows of openings of the plate 34, it is possible to adjust the spacing between the confronting surfaces of the left-hand ends of the elongated gauging elements 30 and 32. Adjustments in that spacing will change the size of the fish which can slip through the elongated opening in end portion 29 which is defined by those elongated gauging elements. If desired, the opening 46 in the elongated gauging element 30 could be dispensed with; and, in such event, the elongated gauging element 30 would have to be shifted a short distance longitudinally as well as a short distance latitudinally, whenever an adjustment was made in the spacing between the confronting surfaces of the elongated gauging elements 30 and 32 which required the bolt of the nut and bolt combination 44 to be shifted from one of the rows of openings 40 to the other of those rows of openings of the plate 34.

The plates 36 and 38 have corresponding rows of openings; and the nut and bolt combinations which secure those plates to the elongated gauging elements 30 and 32 will be adjusted to provide the same distance between the centers and right-hand ends of the confronting surfaces of the elongated gauging elements 30 and 32 which the nut and bolt combination 44 provides between the left-hand ends of those confronting surfaces. As a result, the confronting surfaces of the elongated gauging elements 30 and 32 will coact to define a horizontally-extending, elongated opening of constant width in the end portion 29 of the fishing net. In the said one preferred embodiment of fishing net, the width of that elongated opening can be set at any one of a large number of values between zero and 3 inches. Where the fish that are to be caught in the fishing net 20 are golden shiner minnows, the spacing between the confronting surfaces of the elongated gauging elements 30 and 32 will preferably be in the range of three-sixteenths to three-eighths of an inch. However, where the fish that are to be caught in the fishing net 20 are catfish, the spacing between the confronting surfaces of the elongated gauging elements 30 and 32 will be 1½ to 2½ inches.

The numeral 48 denotes a sturdy pipe which has been driven into the bottom of the body of water in which the fishing net 20 will be used; and the upper end of that pipe will always project above the surface of that body of water. The numeral 50 denotes a similar pipe; and the pipe 50 is disposed adjacent one end of the elongated support 22, while the pipe 48 is disposed adjacent the other end of that elongated support. The numeral 52 denotes a fastener which is generally J-shaped in configuration, but which is used in inverted position. The long arm and the short arm of that J-shaped fastener are dimensioned to permit the connecting portion therebetween to freely move down into engagement with the upper edge of the pipe 48 as the long arm of that J-shaped fastener is telescoped down within that pipe. An eye is formed in the free end of the short arm of the J-shaped fastener 52; and that eye holds the eye of a pulley 54. Any laterally directed, downwardly inclined, force which is applied to the pulley 54 will be transmitted to the inverted J-shaped fastener 52 by the eye of that pulley and by the eye in the free end of the short arm of that J-shaped fastener; and such a force will tend to hold that J-shaped fastener firmly in engagement with the pipe 48. As a result, the inverted J-shaped fastener 52 can effectively hold the pulley 54 in assembled relation with the pipe 48 — even though the connecting portion between the long arm and the short arm of that J-shaped fastener is long enough to enable that J-shaped fastener to loosely telescope down onto the upper end of the pipe 48.

A similar J-shaped fastener is denoted by the numeral 56; and that J-shaped fastener loosely telescopes downwardly onto the upper end of the pipe 50. The J-shaped fastener 56 holds a pulley 58 in assembled relation with the pipe 50. Any laterally directed, downwardly inclined force which is applied to the pulley 58 will be transmitted to the inverted J-shaped fastener 56 by the eye of that pulley and by the eye in the free end of the short arm of that J-shaped fastener; and such a force will tend to hold that J-shaped fastener firmly in engagement with the pipe 50.

Figure 7:
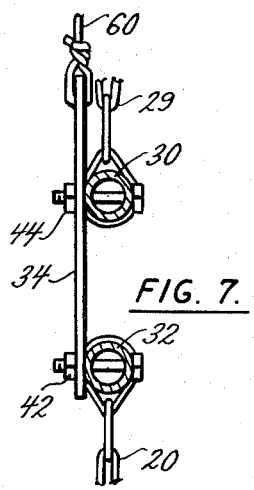

The numeral 60 denotes a rope which has one end thereof passed through an opening in the upper end of the plate 34 and then tied, as shown particularly by FIGS. 6 and 7. That rope then extends upwardly, passes around, and is tied to the left-hand end of the elongated support 22 to enable that rope, rather than the end portion 29 of the fishing net 20, to support the weight of the left-hand end of the elongated gauging elements 30 and 32. The rope then extends upwardly from the left-hand end of the elongated support 22, around the grooved wheel of the pulley 54, over to and around the grooved wheel of the pulley 58, and then down to the right-hand end of the elongated support 22 — to which it is tied. The remaining portion of the rope 60 extends downwardly to an opening in the upper end of the plate 38 to which it is tied — thereby relieving the end portion 29 of the fishing net 20 of the weight of the right-hand ends of the elongated gauging elements 30 and 32. More specifically, the rope 60 and the elongated support 22 coact to free the end portion 29 of the fishing net 20 from both vertically directed and horizontally directed stresses due to the weight of the elongated gauging elements 30 and 32. A further rope 64 extends from the midpoint of the rope 60 to a stake 62 which is driven into the ground a substantial distance from the shore 23.

Different materials could be used in making the ropes 24, 60 and 64. Preferably, those ropes will be made from materials of the type customarily used in making ropes for fishing nets or for use with boats.

The rope 60 and the rope 64 are made long enough to enable the elongated support 22 to be lowered onto the bottom of the body of water in which the fishing net 20 is to be used. However, those ropes are made short enough to enable the elongated support 22 to be raised to the position shown by FIG. 5. When that elongated support is in that position, the upper edge of the end portion 29 of the fishing net 20, the upper edge of the side portion 25, and the upper edge of the side portion 27 will be out of the water; but the greatest part of the center portion 21 will be resting on the bottom. This is important; because it enables the end portion 29 and the side portions 25 and 27 to be raised up to the position shown in FIG. 5 without the expenditure of energy and without the time lag which the raising of the center portion 21 would involve.

When the elongated support 22 is resting on the bottom of the body of water, the end portion 29, most of the side portion 25, most of the side portion 27, and most of the center portion 21 also will be resting on that bottom. However, the shallow end of the side portion 25, the shallow end of the side portion 27, and the adjacent end of the center portion 21 will rest upon, or be held above, the shore 23. The submerged part of the side portion 25 of the fishing net 20 will be lying almost directly below the portion of the rope 24 which extends between the stake 26 and the left-hand end of the elongated support 22, the end portion 29 of that fishing net will be lying almost directly below that elongated support, and the submerged part of the side portion 27 of that fishing net will be lying almost directly below the portion of the rope 24 which extends between the stake 28 and the right-hand end of that elongated support. This is important; because it enables the movements of the end portion 29 and of the side portion 25 and 27 of the fishing net 20 to be essentially vertical as the elongated support 22 is raised to the position of FIG. 5.

To raise the elongated support 22 to the position of FIG. 5, the fisherman will pull inwardly on the rope 64; and the rope 60 will then raise that elongated support to that position. Any fish that are in position immediately above the center portion 21 of the fishing net 20 will quickly sense the consequent movement of the elongated support 22 and of the end portion 29 and side portions 25 and 27 of the fishing net 20. Because those fish will not sense any movement of that part of the center portion 21 which is lying on, or above the level of, the shore 23, those fish will momentarily start toward the shore. By the time the fish change direction and start swimming away from, or parallel to, the shore 23, the end portion 29 and the side portions 25 and 27 will be in position to intercept those fish; because those portions of the fishing net 20 will quickly move to the position of FIG. 5. Such quick movement is possible because those portions can move to that position while the center portion 21 is still lying on the bottom of the body of water and because those portions need only move directly upwardly and not laterally as well.

When the fishing net 20 is in the position of FIG. 5, the elongated gauging elements 30 and 32 will define a horizontally extending opening which is adjacent the bottom of the fishing net 20, but which is spaced above the bottom of the body of water. At such time, that horizontally extending opening will be unobstructed. All of the entrapped fish will attempt to escape from the fishing net 20, but only small fish will be able to pass through the horizontally extending opening defined by the elongated gauging elements 30 and 32. Those small fish will escape through that horizontally extending opening; and this is desirable, because it will keep those small fish from experiencing the injuries and stresses which small fish experience when handled. Also, it will reduce the weight which the fishing net 20 must support when it is subsequently raised above the position of FIG. 5; and it will save the time and labor involved in hand-sorting those small fish from the large fish.

The numeral 66 denotes a receptacle which overlies part of the central portion 21 of the fishing net 20, and thus will normally be disposed below the surface of the body of water. If desired, that receptacle could be secured to that part of the center portion 21 by twine or by fasteners; but, where that receptacle is non-buoyant, gravity can be depended upon to hold that receptacle in position relative to that part of that center portion. While different receptacles or containers could be used as the receptacle 66, a standard and usual galvanized or enamelled pan is very useful. A J-shaped bolt 68 has the threaded shank thereof disposed within an opening in one side of the receptacle 66; and a wing nut 70 releasably holds that J-shaped bolt in position relative to that side of that receptacle. A mercury switch 72 of standard and usual form is embedded within a buoyant float 73; and the float has openings 74 and 76 at the opposite ends thereof. Each of those openings is dimensioned to telescope loosely over the short arm of the J-shaped bolt 68 when that J-bolt is separated from the receptacle.

In the said one preferred embodiment of fishing net, the float 73 is about 6 inches long, exclusive of the ears thereon which have the openings 74 and 76 therein; and that float is about 4 inches wide and about 1 inch thick. That float can be made hollow as shown; but it will preferably be cast or molded around the mercury switch 72. The numeral 78 denotes the electrical contacts of the mercury switch 72; and those contacts are located adjacent one end of the housing of that mercury switch, as shown by FIGS. 2 and 3. A quantity of mercury 80 is provided within the housing of the mercury switch 72, and that mercury will be displaced from the contacts 78 whenever that switch is in the solid-line position shown in FIG. 2. However, when the mercury switch 72 assumes the dotted-line position in FIG. 2, the mercury 80 will engage and bridge the contacts 78. Conductors 82 extend from the contacts 78 of the mercury switch 72 through the float 73 to a battery 84 and to a lamp 86 which are located on the shore. As indicated by FIG. 4, one of those conductors extends between one of the contacts 78 and the positive terminal of the battery 84, while the other of those conductors extends from the other of those contacts to one terminal of the lamp 86. The other terminal of that lamp is connected directly to the negative terminal of the battery 84.

The float 73 acts to make the mercury switch 72 buoyant in nature; and the buoyancy of that mercury switch biases that mercury switch for movement toward the dotted-line position in FIG. 2. However, when enough fish food 88 is placed over the free end of the float 73, that float and the mercury switch 72 can be held in the solid-line position in FIG. 2. As long as the mercury switch 72 is in that solid-line position, that mercury switch will be "open." However, as soon as that mercury switch moves to the dotted-line position of FIG. 2, that mercury switch will "close."

To install the fishing net 20, it is only necessary to secure the rope 24 to the stakes 26 and 28, to telescope the long arms of the J-shaped fittings 52 and 56 downwardly into the upper ends of the pipes 48 and 50, and to tie the rope 64 to the stake 62. To secure the rope 24 to the stake 26, the fisherman will "work" a sufficiently long length of that rope out of the fishing net 20, adjacent the shallow end of the side portion 25, to enable that length to be looped around and tied to that stake. Similarly, to secure the rope 24 to the stake 28, the fisherman will "work" a sufficiently-long length of that rope out of the fishing net 20, adjacent the shallow end of the side portion 27, to enable the length to be looped around and tied to that stake. As indicated by FIG. 1, those lengths of the rope 24 will be secured to the stakes 26 and 28 at points above the ground — to keep the end of the center portion 21 which is adjacent those stakes out of the water. To telescope the long arms of the J-shaped fittings 52 and 56 downwardly into the upper ends of the pipes 48 and 50, it is only necessary to wade or to row out to the pipes 48 and 50, and then fit those long arms down into those upper ends of those pipes. To secure the rope 64 to the stake 62, it is only necessary to take up any slack in that rope and then tie that rope to that stake. As a result, it should be apparent that it is a simple and easy matter to install the fishing net 20.

It also is a simple and easy matter to dismount the fishing net 20. All that need be done is to raise the long arms of the J-shaped fittings 52 and 56 out of the upper ends of the pipes 48 and 50, to free the rope 24 from the stakes 26 and 28, and to free the rope 64 from the stake 62. No part of the fishing net 20 need be separated from any other part of that fishing net; and, instead, that fishing net can be bodily carried ashore, dried, and then stored away.

To use the fishing net 20 to harvest fish, the rope 64 will be set to permit the end portion 29, the elongated support 22, almost all of the side portion 25, almost all of the side portion 27, and almost all of the center portion 21 to rest on the bottom of the body of water. A quantity of fish food 88 will then be placed in the receptacle 66 to attract the fish. Additional fish food will be added each day or each night for two or three days — until the fish become accustomed to going to that receptacle to feed. Thereafter, the float 73 will have the opening 74 therein fitted over the free end of the J-shaped bolt 68, and will be set in the solid-line position in FIG. 2. Where that is done, the mercury 80 in the mercury switch 72 will bridge the spaced contacts 78; and then further fish food 88 will be added to the receptacle 66 to hold that float in that solid-line position. The receptacle 66 will be set in position on a part of the center portion 21 of the fishing net 20 which is below the surface of the body of water; and then one conductor 82 will be connected to one terminal of the motor 87 of a motor-driven timer, the other conductor 82 will be connected to one terminal of the secondary winding of a step-down transformer 38', and the other terminal of the motor 87 will be connected to the other terminal of that secondary winding — all as shown by FIG. 14. The motor-driven timer can be the type of motor-driven timer which is used with household thermostats; and the transformer 38' can be the type of transformer which is used with household thermostats.

The dial of the motor-driven timer will then be set to correspond to local time; and that motor-driven timer will continue to rotate that dial until sufficient numbers of fish move into position immediately above the center portion 21 of the fishing net 20 to eat enough of the food 88 to free the float 73 for movement to the dotted-line position of FIG. 2. At such time, the mercury 80 in the mercury switch 72 will flow away from the contacts 78 of that mercury switch; and, thereupon, the motor 87 of the motor-driven timer will become de-energized and will remain de-energized. Subsequently, when the fisherman checks the dial of the motor-driven timer, he will know when the fish were actively feeding during the preceding 24 hour period. During the succeeding 24 hour period, the fisherman will free the float 73 from the J-shaped bolt 68, and will then connect that float to that J-shaped bolt by means of the opening 76. Thereafter, as the fisherman moves the float 73 to the solid-line position in FIG. 2, and covers the free end of that float with food 88, the mercury 80 in the mercury switch 72 will be displaced from the contacts 78. At such time, the conductors 82 will be disconnected from the motor 87 and transformer 38' of FIG. 14 and will be connected to the lamp 86 and the battery 84, as shown by FIG. 4. The fisherman will then wait until a half hour or so before the time which was indicated by the dial of the motor-driven timer; and then he will move to a position where he will be able to see the lamp 86 when that lamp becomes illuminated. As sufficiently large numbers of fish move into position above the fishing net 20 to eat enough of the food 88 to release the float 73, the mercury 80 in the mercury switch 72 will bridge the contacts 78 and enable the battery 84 to illuminate the lamp 86. Thereupon, the fisherman will rapidly pull inwardly on the rope 64 — thereby causing the rope 60 to raise the elongated support 22 up to the position shown by FIG. 5. As that elongated support moves upwardly to that position, it will raise the end portion 29, and it will act through the rope 24 to raise the side portions 25 and 27 of that fishing net; but it will not raise any appreciable parts of the center portion 21. The upward movement of the elongated support 22 and the portions 25, 27 and 29 of the fishing net 20 will alert the fish; but those fish will tend to move away from, rather than toward, that elongated support and those portions. Because the edge of the center portion 21 which is adjacent the stakes 26 and 28 will not be in the water; that edge will not tend to repel the fish; and hence the fish will tend to move toward that edge. By the time the fish change direction and start swimming away from, or parallel to, the shore 23, the end portion 29 and the side portions 25 and 27 will be in position to intercept those fish; because those portions of the fishing net 20 will quickly move to the position of FIG. 5 — all as explained hereinbefore. The fish will seek to escape from the fishing net, but only small fish will be able to pass through the elongated opening defined by the elongated gauging elements 30 and 32.

The entrapped fish should be held within the fishing net 20, and that fishing net should be held in the position of FIG. 5, for about 12 hours or so. Where that is done, almost all of the small fish will have found their way to and through the elongated opening defined by the elongated gauging elements 30 and 32. Also, the large fish will have excreted all of the waste matter which they would tend to excrete as a result of the food which they ate prior to the raising of the elongated support 22 to the position of FIG. 5. In addition, those fish will have become calm and will have recovered from the excitement of having been trapped. Experience has shown that where fish are shipped shortly after they have been fed, those fish tend to develop indigestion and other problems; and many of those fish die during shipment. However, where the fish are held within the fishing net 20 for about 12 hours, they have a high survival rate during the shipping of those fish.

After the fish have been removed from the fishing net 20 and placed within water-filled containers for shipment, that fishing net can be used to harvest further fish. Alternatively, that fishing net can be removed from the body of water, dried, and then stored away for future use.

Figure 8:
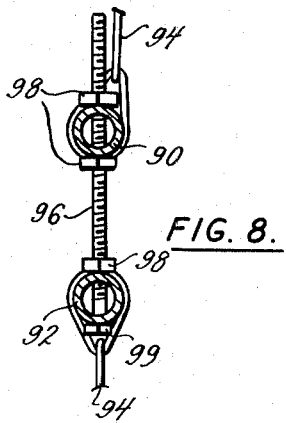

Referring particularly to FIG. 8, the numeral 90 denotes an elongated gauging element which is comparable to the elongated gauging element 30, and the numeral 92 denotes an elongated gauging element which is comparable to the elongated gauging element 32. The numeral 94 denotes a fishing net which has an elongated, horizontally extending opening therein that has the sides thereof defined by the elongated gauging elements 90 and 92. A bolt 96 has two nuts 98 threaded thereon intermediate the elongated gauging elements 90 and 92, has the head 99 thereof abutting the lower surface of the elongated gauging element 92, and has a nut 98 abutting the upper surface of the elongated gauging element 90. If desired, a continuously threaded element could be substituted for the bolt 96; and, in that event, the head 99 would be replaced by a further nut 98. The bolt 96 could be used to replace the plate 34 in FIGS. 6 and 7; and two additional bolts 96 would be used to replace the plates 36 and 38. Adjustment of the distance between the confronting surfaces of the elongated gauging elements 90 and 92 could be effected by appropriate settings of the nuts 98. Specifically, to move the elongated gauging element 90 closer to the elongated gauging element 92, the second uppermost nut 98 would be rotated downwardly toward the elongated gauging element 92, and then the top nut 98 would be rotated downwardly to press the elongated gauging element 90 against that second-uppermost nut. Conversely, to move the elongated gauging element 90 further away from the elongated gauging element 92, the uppermost nut 98 would be rotated away from the elongated gauging element 90 and then the second-uppermost nut 98 would be rotated to urge that elongated gauging element against the uppermost nut 98.

Figure 9:
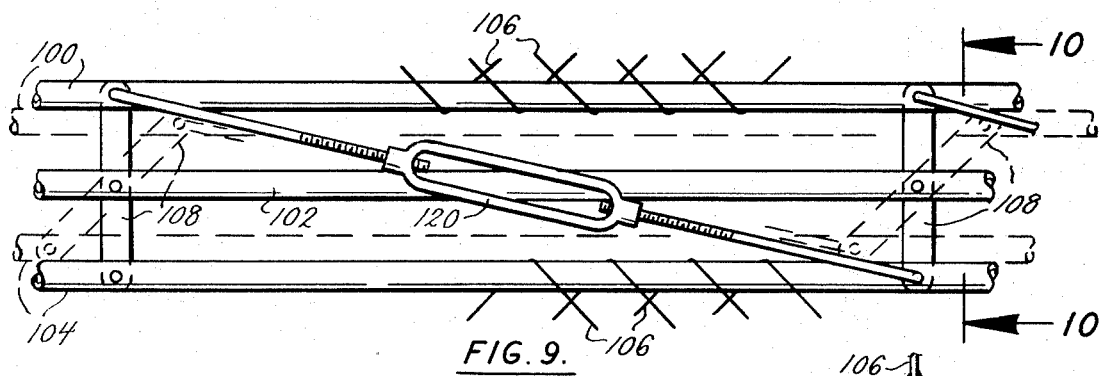
Figure 10:
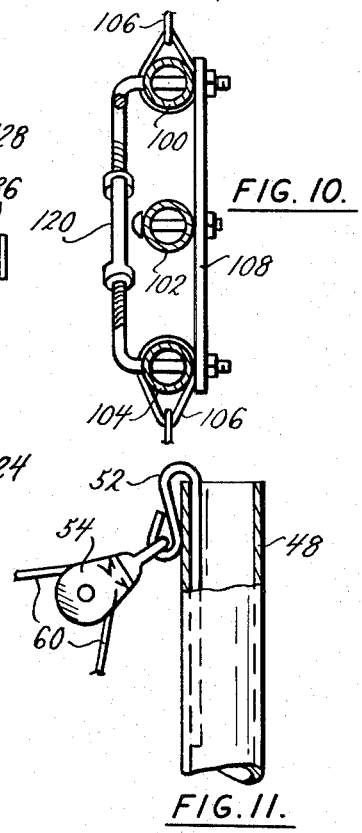
Figure 11:
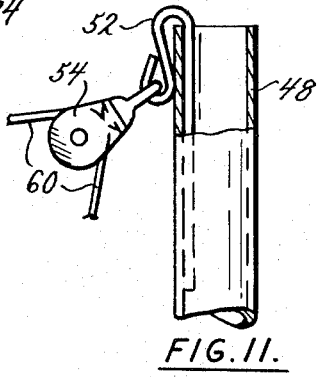

Referring to FIGS. 9 and 10, the numerals 100, 102 and 104 denote elongated gauging elements which are comparable to the elongated gauging elements 30 and 32 in FIGS. 6 and 7, and to the elongated gauging elements 90 and 92 in FIG. 8. The elongated gauging elements 100 and 104 are disposed at, and define the opposite sides of, an elongated, horizontally directed opening in a fishing net 106. Spacers 108 are pivotally secured to each of the elongated gauging elements 100, 102 and 104; and those spacers can be at right angles to those elongated gauging elements, as shown by solid lines in FIG. 9, or can be set at angles to those elongated gauging elements, as indicated by dotted lines in FIG. 9. A turnbuckle 120 has one end thereof connected to the upper end of the left-hand spacer 108, and has the other end thereof connected to the lower end of the right-hand spacer 108. The elongated gauging element 100 will be supported by the lower ends of the rope 60; and the elongated gauging elements 102 and 104 will respond to the force of gravity to move downwardly as far from the elongated gauging element 100 as the spacers 108 and the turnbuckle 120 will allow them to do. Shortening of the turnbuckle 120 will decrease the distance between the upper end of the left-hand spacer 108 and the lower end of the right-hand spacer 108, and will thereby tend to shift the lower elongated gauging element 104 to the left relative to the elongated gauging element 102, while tending to shift the elongated gauging element 100 to the right relative to the elongated gauging element 102. Such shifting will move the confronting surfaces of the elongated gauging elements 100 and 102 closer together, and also will shift the confronting surfaces of the elongated gauging elements 102 and 104 closer together. Consequently, by shortening the effective length of the turnbuckle 120, it is possible to decrease the size of the fish which can escape from the net 106 through the space between the confronting surfaces of the elongated gauging elements 100 and 102 and through the space between the confronting surface of the elongated gauging elements 102 and 104.

Figure 12:
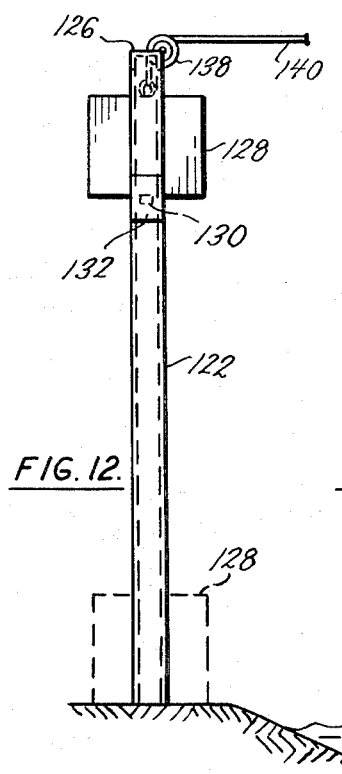
Figure 13:
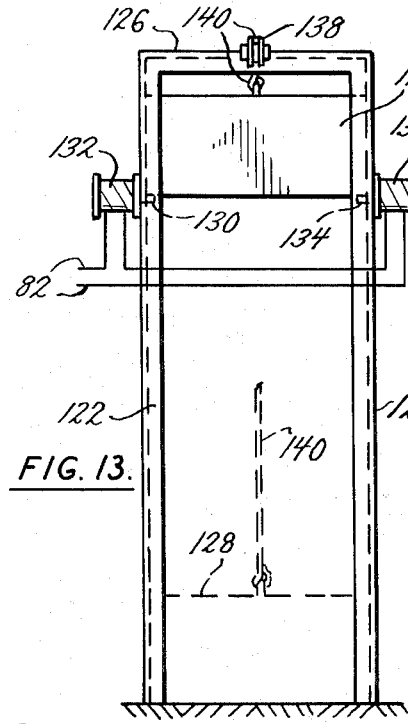

Referring to FIGS. 12 and 13, the numeral 122 denotes a channel which has the lower end thereof driven into the ground a short distance from the shore; and the numeral 124 denotes a similar channel. The upper ends of the channels 122 and 124 are bridged by a channel 126; and those three channels define a sturdy, inverted U-shaped support. The numeral 128 denotes a weight which has ears therein extending into, and being guided by, the flanges of the channels 122 and 124. The engagements between the ears on the weight 128 and the flanges of the channels 122 and 124 are sufficiently loose to permit the weight 128 to move freely from the solid-line position to the dotted-line shown in FIGS. 12 and 13. A rope 140, which is comparable to the rope 64 of FIG. 1, is connected to the upper end of the weight 128; and that rope passes over the grooved wheel of a pulley 138 which is secured to the channel 126. The outer end of the rope 140 will be connected to the middle of a rope such as the rope 60 in FIG. 1.

A trip-type latch 130 of standard and usual design is secured to the channel 122 adjacent the solid-line position of the weight 128, and a similar trip-type latch 134 is secured to the channel 124 adjacent the solid-line position. When those trip latches are in their normal positions, they will hold the weight 128 in the solid-line position shown in FIGS. 12 and 13. However, a solenoid 132, which is mounted on the channel 122, can be actuated to release the trip-type latch 130; and a solenoid 136, which is mounted on the channel 124, can be energized to release the trip-type latch 134. As shown particularly by FIG. 13, the solenoids 132 and 136 are connected in series; and they will be connected to the mercury switch 72 and to a suitable source of power.

The rope 140 will be made long enough to permit the elongated support 22 and most of the fishing net 20 to rest on the bottom of the body of water whenever the weight 128 is in the solid-line position shown by FIGS. 12 and 13. The channels 122 and 124 are high enough, usually between 6 and 7 feet, to enable the movement of the weight 128 from the solid-line position to the dotted-line position of FIGS. 12 and 13 to raise the elongated support 22 up to the position shown by FIG. 5. The structure of FIGS. 12 and 13 can automatically respond to actuation of the mercury switch 72 to raise the elongated support 22 to the position shown by FIG. 5; and such structure is desirable, because it frees the fisherman of the obligation to be present when the fishing net 20 is to be raised to fish-holding position.

In using the structure of FIGS. 12 and 13, the fisherman will connect the mercury switch 72 to the J-shaped bolt 68 in the receptacle 66 by telescoping the opening 76 over the free end of that J-shaped bolt. Food 88 will then be used to hold the float 73 in the solid-line position of FIG. 2; and the receptacle 66 will be placed within a part of the fishing net 20 that is to be submerged in the water. Thereafter, the weight 128 will be raised to the solid-line position shown by FIGS. 12 and 13, and it will be held there by the trip-type latches 130 and 134. One of the conductors 82 will be connected to the conductor which extends directly to the solenoid 136, the other of the conductors 82 will be connected to a source of power, and that source of power will be connected to the conductor which extends to the left from the solenoid 132 in FIG. 13.

The fisherman need not be concerned about the time when the fish will congregate in sufficient numbers adjacent the receptacle 66 to eat the food 88 therein; because the solenoids 132 and 136 will automatically become energized as the fish eat enough of the food to release the float 73 for movement to its raised position. The weight 128 will automatically move downwardly and raise the elongated support 22 to the fish-holding position of FIG. 5; and that weight will continue to hold that elongated support in that position as long as desired.

Where a switch such as the mercury switch 72 is used to actuate the solenoids 132 and 136, those solenoids must be continuous-duty solenoids; because the mercury switch 72 will remain in circuit-closing position until the fisherman changes the attitude of that mercury switch. If it is desirable to use solenoids other than continuous-duty solenoids, the mercury switch 72 should be replaced by a mercury switch which can close the contacts thereof only momentarily as it shifts from a lower position to an upper position.

If desired, the channels 122, 124 and 126 and the weight 128 could be replaced by a single pole or pipe and a bucket of rocks or concrete. A hook on the rope 140 could be held by a trip-free latch; and a single solenoid could be actuated to release that trip latch. Because the weight 128 weighs only fifty pounds, various informal and light-weight arrangements could be used to releasably support that weight or an equivalent weight.

If desired, weight 128, the solenoid 132 and 136, and the trip-type latches 130 and 134 could be replaced by an electric motor equipped with a drum or winch onto which the rope 140 could be wound. Such a motor should be a stall-type motor, or it should be a motor that was equipped with a timer which would open the circuit to that motor after it had been energized for a predetermined length of time. In either case, the rope 60 should have knots in it or protuberances on it which would positively halt raising of the elongated support 22 as that elongated support reached the position of FIG. 5. Those knots or protuberances would keep the elongated support 22 from being raised so far that the fish held within the fishing net 20 would be unduly cramped or would be exposed to the air.

If desired, a helical extension spring could be substituted for the weight 128 of FIGS. 12 and 13. Where that was done, a trip-type latch would normally hold that spring in extended position; and the rope 140 would be connected to the end of the spring which was held by the trip-type latch. Actuation of the mercury switch 72 in the receptacle 66 would enable that trip-type latch to free that spring; and, thereupon, that spring would retract and apply a pull to the rope 140 which would raise the elongated support 22 to the position of FIG. 5.

FIG. 2 shows a receptacle 66 which is heavier than water, and which will rest on the center portion 21 of the fishing net 20. If desired, that receptacle could be made buoyant; as by being made of a light-weight plastic material. In such event, the mercury switch 72 could be fixedly secured to one side of that receptacle, and a weight could be secured to the other side of that receptacle. As long as that receptacle was filled with food, it would remain in an essentially-horizontal position; and the mercury 80 would be displaced from the contacts 78 of the mercury switch 72. However, as soon as the fish had eaten away enough of the food, the side of that receptacle which was remote from the weight would move upwardly and thereby shift the mercury into engagement with the contacts of that switch.

If desired, a fisherman could remove the mercury switch 72 and still determine the time when the fish within a body of water ate at a given point in the body of water. Specifically, the fisherman could select a buoyant receptacle that could be submerged within the body of water, he could place enough food within that receptacle to overcome its buoyancy, and he could then submerge that receptacle within that body of water at the given point. Thereafter, the fisherman would watch the surface of the body of water until the fish had eaten enough of the food to permit the receptacle to rise to that surface; and then he would note the time. Because it takes the fish some time to eat enough food to permit the receptacle to rise to the surface, the fisherman should plan to raise his fishing net about 15 to 30 minutes earlier than the same time 24 hours later.

Because fish frequently feed at night, it would be desirable to provide a buoyant receptacle which could be seen in the dark — such a receptacle being visible to the fisherman as it rises to the surface after the fish have eaten enough of the food to let that receptacle rise. A receptacle which can be seen in the dark can be attained by making that receptacle out of a plastic material which tends to shine, glow, fluoresce or the like in the presence of even very small amounts of light. Such a receptacle could be seen on moonlit nights, and could be seen in the light, from a dim flashlight, which was occasionally directed over the surface of the body of water.

Alternatively, a buoyant receptacle of ordinary plastic material could be made readily visible at night by painting it, or otherwise coating it, with a plastic material which tends to shine, glow, fluoresce or the like in the presence of even very small amounts of light. Moreover, a cork, a fishing bobber or other buoyant object could be used instead of a receptacle — such an object being temporarily held within a buoyant or non-buoyant receptacle by being overlain by food; and then rising to the surface after the fish have eaten enough of the food to let that object rise. Similarly, such a cork, fishing bobber or other buoyant object could be placed under a buoyant receptacle and held adjacent the bottom of the body of water until after the fish have eaten enough of the food to let that receptacle rise sufficiently to release that cork, fishing bobber or other buoyant object. Any one of the corks, fishing bobbers or other buoyant objects could be made from, or suitably coated with, a plastic material which tends to shine, glow fluoresce or the like in the presence of even very small amounts of light. In any of those ways, a fisherman can attain prompt and reliable information as to the time when large numbers of fish are in position above the center portion 21 of the fishing net 20.

If desired, a receptacle which was not buoyant in nature could have one side thereof rendered buoyant by having the float 73 secured to it. That receptacle could be held in essentially horizontal position by filling it with food; and the mercury switch 72 would remain in "open" condition until the fish had eaten away substantial quantities of that food. Thereafter, the buoyancy of the float 73 would raise the one side of that receptacle and cause the mercury switch to "close."

Various designs and shapes could be provided for the receptacle 66. If desired, a standard and usual water bucket could be used as that receptacle; and the float 73 could be loosely wired to one or the other of the openings in that bucket which hold the ends of the bail of that bucket. Food would normally hold the float 73 adjacent the bottom of the bucket with the mercury switch 72 in "open" position; but that float would move upwardly to switch-closing position as soon as the fish had eaten away enough of that food.

Where the center portion 21 of the fishing net 20 has a lateral dimension of 12 feet and a longitudinal dimension of 15 feet, it is able to trap and hold hundreds of pounds of fish. In at least one instance, such a fishing net trapped more than 1,000 pounds of catfish when it was raised upwardly to the position of FIG. 5. To attract such large numbers of fish into position above the fishing net, it is necessary to use more than one receptacle for food. By using three receptacles that are the size of a standard and usual wash basin, it is possible to attract enough fish into position above the fishing net to trap up to 1,000 pounds of fish. Although a mercury switch 72 could be mounted adjacent each of those receptacles, it is usually sufficient to mount such a switch on any one of those receptacles.

If the mesh of the fishing net 20 is too small to permit the elongated support 22 to be woven into the top edge of the end portion 29, a pocket could be sewn into that top edge to receive and hold that elongated support. Similarly, if the mesh of the fishing net 20 is too small to permit the elongated gauging element 30 or the elongated gauging element 32 to be woven into the appropriate edge of the elongated opening adjacent the lower edge of the end portion 31, a pocket could be sewn into that end portion to receive and hold that elongated gauging element.

If desired, the elongated gauging elements 30 and 32, the elongated gauging elements 90 and 92, or the elongated gauging elements 100, 102 and 104 could be set so close to each other that essentially no fish could escape through the spaces between those elongated gauging elements. Where that was done, the sizes of the fish that could be trapped within the fishing nets 20, 94 and 106 would be determined by the size of the interstices in the mesh of those fishing nets. Such close settings of the elongated gauging elements would be desirable where it was necessary to remove as many fish as possible from the pond or creek.

The fishing net 20 does not bruise or injure any of the fish which it traps as it is raised to the position of FIG. 5. In fact, that fishing net does not make the trapped fish net-shy; because at least one fish, that was readily recognizable because of a prior injury, was trapped several nights in succession and returned to the pond each succeeding morning. The fishing net 20 harvests the fish with minimal excitement for those fish; and it permits that excitement to abate by holding those fish for about twelve hours in the same water to which they have been accustomed. Further, because the end portion 29 and the side portions 25 and 27 are essentially vertically disposed, the top edges of those portions can be at the surface of the water and yet leave the major part of the center portion 21 far enough below the surface to avoid cramping the trapped fish and to make sure that all of those fish are covered with water. Additionally, because the side portions 25 and 27 are vertically disposed, it is easy for the fisherman to reach the fish as he removes them from the fishing net 20 and transfers them to a water-filled container.

The present invention minimizes the amount of work which is required in the harvesting of fish; and it makes it possible for one man to harvest and ship hundreds of pounds of fish in a 24 hour period. In fact, the structure of FIGS. 12 and 13 relieves the fisherman of all work other than the work of setting the fishing net and then of subsequently emptying that fishing net.

Whereas the drawing and accompanying description have shown and described a preferred embodiment of the present invention it should be apparent to those skilled in the art that various changes may be made in the form of the invention without affecting the scope thereof.

What I claim is:

1. A fishing net that has a portion thereof disposed below the surface of a body of water, an electric switch adjacent said portion of said fishing net, said electric switch being biased for movement toward a predetermined position, means adjacent said portion of said fishing net which can respond to food to block movement of said electric switch toward said predetermined position, said electric switch responding to the eating of said food by fish to move into said predetermined position, a rope that is connected to said fishing net, rope-guiding means adapted to be positioned above the level of said surface of said body of water and to guide a portion of said rope so said portion of said rope can be pulled upwardly to raise said portion of said fishing net upwardly toward said surface of said body of water, further means attached to said rope and being adapted to pull said portion of said rope upwardly and thereby raise said portion of said fishing net upwardly toward said surface of said body of water, and switch-responsive means responsive to movement of said electric switch into said predetermined position to release said further means and thereby enable said further means to pull said portion of said rope upwardly and thereby raise said portion of said fishing net upwardly toward said surface of said body of water.

2. A fishing net that is disposed within a body of water to define an area and that has a portion thereof disposed below the surface of said body of water to permit fish to enter said area, an electric switch adjacent said portion of said fishing net, and conductors extending from said switch to a utilization device, said electric switch being biased for movement toward a predetermined position, and means, including a container for food, which is adjacent said portion of said fishing net, said container for food being dimensioned to hold a mass of food which can feed a large number of fish, said means responding to said mass of food to block movement of said electric switch toward said predetermined position, said electric switch responding to the eating of said mass of food by fish to move into said predetermined position and thereby apply a signal to said utilization device.

3. A fishing net as claimed in claim 2 wherein said electric switch is in "open" condition until it moves into said predetermined position, wherein said utilization device is a signaling device, and wherein said utilization device is actuated when said electric switch moves into said predetermined position.

4. A fishing net as claimed in claim 2 wherein said electric switch is in "closed" condition until it moves into said predetermined position, and wherein said utilization device is a timing device.

5. A fishing net as claimed in claim 2 wherein net-raising means is connected to one part of the perimeter of said fishing net and is adapted to permit said one part of said perimeter of said fishing net to be disposed below said surface of said body of water, wherein said net-raising means is part of said utilization device, wherein said net-raising means permits said one part of said perimeter of said fishing net to be disposed below said surface of said body of water whenever the first said means blocks movement of said electric switch toward said predetermined position, and wherein said utilization device responds to movement of said electric switch into said predetermined position to cause said net-raising means to initiate movement of said one part of said perimeter of said fishing net toward said surface of said body of water.

6. A fishing net as claimed in claim 2 wherein net-raising means is connected to one part of the perimeter of said fishing net and is adapted to permit said one part of said perimeter of said fishing net to be disposed below said surface of said body of water, wherein said net-raising means is part of said utilization device, wherein said net-raising means permits said one part of said perimeter of said fishing net to be disposed below said surface of said body of water whenever the first said means blocks movement of said electric switch toward said predetermined position, wherein said net-raising means can apply an upwardly directed force to said one part of said perimeter of said fishing net to raise said one part of said perimeter of said fishing net toward said surface of said body of water, wherein said utilization device also includes an electro-magnetic element that is connected to said net-raising means and that is actuatable to determine the moment when said net-raising means applies said upwardly directed forces to said one part of said perimeter of said fishing net to raise said one part of said perimeter of said fishing net toward said surface of said body of water, and wherein said electromagnetic element is connected to and is controlled by said electric switch, said electromagnetic element enabling said net-raising means to raise said one part of said perimeter of said fishing net toward said surface of said body of water when said electric switch moves into said predetermined position.

7. A fishing net as claimed in claim 2 wherein net-raising means is connected to one part of the perimeter of said fishing net by a rope and is adapted to permit said one part of said perimeter of said fishing net to be disposed below said surface of said body of water, wherein said net-raising means is part of said utilization device, wherein said net-raising means permits said one part of said perimeter of said fishing net to be disposed below said surface of said body of water whenever the first said means blocks movement of said electric switch toward said predetermined position, wherein said rope can be pulled to raise said one part of said perimeter of said fishing net toward said surface of said body of water, wherein said net-raising means is adapted to pull said rope and thereby raise said one part of said perimeter of said fishing net toward said surface of said body of water, and wherein said utilization device includes switch-responsive means that is connected to said electric switch and to said net-raising means and that responds to movement of said electric switch into said predetermined position to enable said net-raising means to pull said rope and thereby raise said one part of said perimeter of said fishing net toward said surface of said body of water.

8. A fishing net as claimed in claim 2 wherein net-raising means is connected to one part of the perimeter of said fishing net by a rope and is adapted to permit said one part of said perimeter of said fishing net to be disposed below said surface of said body of water, wherein said net-raising means is part of said utilization device, wherein said net-raising means permits said one part of said perimeter of said fishing net to be disposed below said surface of said body of water whenever the first said means blocks movement of said electric switch toward said predetermined position, wherein said rope can be pulled to raise said one part of said perimeter of said fishing net toward said surface of said body of water, wherein said net-raising means includes a weight that is connected to said rope, wherein said weight is normally held in an elevated position by a holding means but can be selectively released by movement of said holding means to move downwardly from said elevated position to pull said rope and thereby raise said one part of said perimeter of said fishing net toward said surface of said body of water, and wherein switch-responsive means responds to movement of said electric switch into said predetermined position to move said holding means and thereby cause said holding means to release said weight to permit said weight to move downwardly from said elevated position to pull said rope and thereby raise said one part of said perimeter of said fishing net toward said surface of said body of water.

* * * * *